United States Patent [19]

Alten

[11] Patent Number: 4,730,965

[45] Date of Patent: Mar. 15, 1988

[54] BOLT CONNECTION TO CONNECT A HOLLOW PROFILED MEMBER TO A PROFILED MEMBER DISPOSED TRANSVERSE THERETO

[76] Inventor: Kurt Alten, Ringstr. 14, D-3015 Wennigsen, Fed. Rep. of Germany

[21] Appl. No.: 931,478

[22] Filed: Nov. 14, 1986

[30] Foreign Application Priority Data

Nov. 15, 1985 [DE] Fed. Rep. of Germany ....... 3540604

[51] Int. Cl.$^4$ ............................................. F16B 13/04
[52] U.S. Cl. ..................... 411/15; 403/258; 52/579; 411/75
[58] Field of Search .................. 411/15, 33, 55, 75, 411/84, 85, 340–344; 403/230, 246, 245, 258; 52/588, 579, 300, 301

[56] References Cited

U.S. PATENT DOCUMENTS

| | | | |
|---|---|---|---|
| 2,998,110 | 8/1961 | Hutzelman | 52/301 |
| 3,654,640 | 4/1972 | Katzman | 52/579 |
| 4,286,891 | 9/1981 | Gerner et al. | 403/246 |
| 4,295,760 | 10/1981 | Warner | 411/33 |

FOREIGN PATENT DOCUMENTS 2011007 7/1979 United Kingdom ................ 403/258

*Primary Examiner*—Neill Wilson
*Attorney, Agent, or Firm*—Becker & Becker, Inc.

[57] ABSTRACT

A bolt connection for connecting a hollow profiled member to a profiled member disposed transverse thereto where connection by welding is inadequate. A plate-like member that is resistant to bending is displaceably supported at one end against the inner surface of the hollow profiled member, and is supported at the other end against an abutment that is disposed remote from the aforementioned inner surface. The length of the plate-like member is slightly greater than the inside height of the hollow profiled member. The bottom of the hollow profiled member is preferably supported on a projection of the other profiled member. The abutment is preferably disposed at the top with the displaceable end of the plate-like member being at the bottom. By tightening the bolt that acts upon the plate-like member, a tight, releasable connection is provided.

7 Claims, 2 Drawing Figures

BOLT CONNECTION TO CONNECT A HOLLOW PROFILED MEMBER TO A PROFILED MEMBER DISPOSED TRANSVERSE THERETO

BACKGROUND OF THE INVENTION

Field of the Invention

The present invention relates to a bolt connection for connecting a hollow profiled member to a profiled member that is disposed transverse thereto. In particular, in order to be able to provide a stable connection that is able to support a load, the present invention relates to connections between profiled metallic members that can be securely interconnected by welding or similar means only with great difficulty. Such connections are particularly useful, for example, for bridges or ramps provided with roadways, rockways, or other travel surfaces.

Thus, the object of the present invention is to provide a bolt connection that makes it possible to have a connection between profiled members that are disposed at right angles to one another, and in particular enables the profiled member that extends in one direction to be made, for example, of steel, and the profiled member that extends in the other direction to be made, for example, of aluminum.

BREIF DESCRIPTION OF THE DRAWING

This object, and other objects and advantages of the present invention, will appear more clearly from the following specification in conjunction with the accompanying schematic drawing, in which:

FIG. 1 is a partial longitudinal cross-sectional view through one exemplary inventive embodiment of a ramp-like transfer bridge, which could even be extensible; and FIG. 2 is a cross-sectional view taken along the line II—II in FIG. 1.

SUMMARY OF THE INVENTION

The bolt connection of the present invention includes a plate-like member that is resistant to bending. This member has a length that is slightly greater than the inside height of the transverse hollow profiled member. One end of the plate-like member is displaceably supported against the inner surface of this profiled member, whereas the other end of the plate-like member is supported against an abutment that is disposed remote from the aforementioned inner surface. In addition, due to the threaded bolt that serves for the screw connection, the displaceably supported end of the plate-like member can be moved in the direction toward the supporting profiled member. The displaceably supported end of the plate-like member is preferably disposed at the bottom, whereas the abutment of the connection is disposed at the top. At the same time, under these conditions, the transverse hollow profiled member is supported from below by a projection of the support profiled member. The hollow profiled member can then be supported at the bottom on this projection, against which it is pressed by the plate-like member.

In order to be able to actuate the aforementioned screw connection, in other words, in order to be able to tighten the nut of the bolt, a downwardly open hollow profiled member is provided, the downwardly directed sides of which are, however, angled off towards the inside. In this way, the screw section is accessible from below.

It is contemplated that the inventive screw connection be particularly applicable to bridge-like constructions. In such a situation, one of the profiled members is a longitudinal member, whereas the hollow profiled member, in conjunction with further such members, extends transverse to the longitudinal member to form the surface that serves for travel. The longitudinal profiled member can also be a hollow profiled member. The transversely directed profiled member is always hollow, and in particular is a profiled member having downwardly directed sides that are bent off towards the inside.

Further specific features of the present invention will be described in detail subsequently.

DESCRIPTION OF PREFERRED EMBODIMENTS

Figure 1:
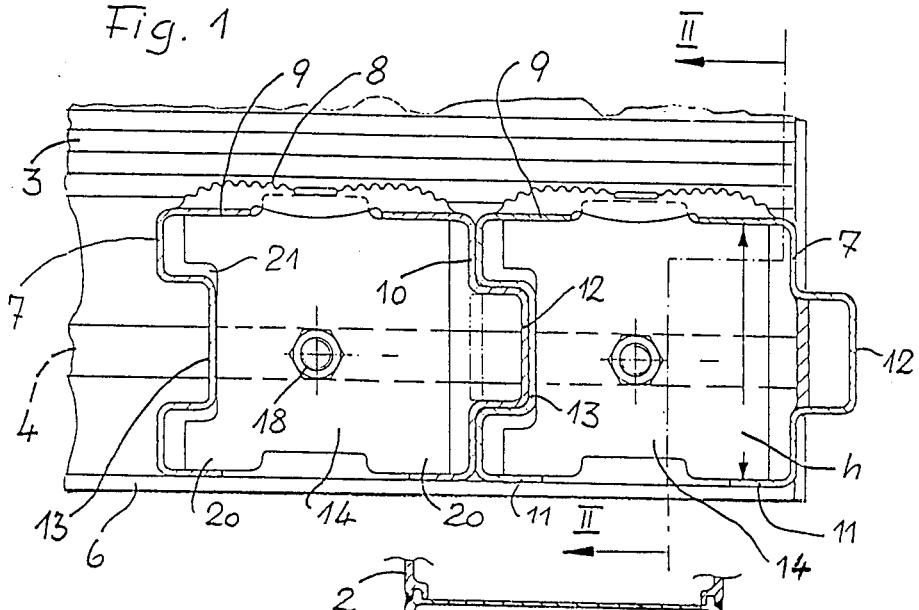
Figure 2:
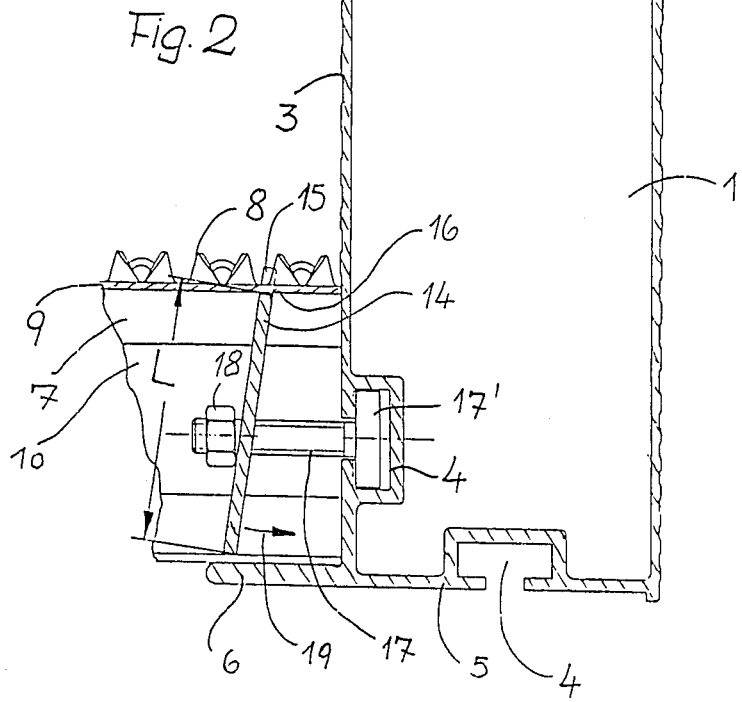

Referring now to the drawing in detail, the illustrated transfer bridge is provided at both edges, i.e. on both sides, with a continuous support member 1 that is embodied as a box-type profiled member and, if desired, can be extended upwardly, as indicated by the reference numeral 2. The lower region of that side wall 3 of the support member 1 that faces the operational surface of the bridge is provided with an undercut, slot-like recess 4. Such a recess can also be disposed in the bottom wall 5, but such an arrangement is not of significance for the present inventive concept. The hollow support member 1 has an approximately rectangular cross-sectional shape, with the bottom wall 5 being extended to form a ledge-like projection 6 that is thicker than the other walls. In the illustrated embodiment, the support member 1 is an extruded profiled member made of aluminum.

Hollow profiled members 7 that extend transverse to the roadway are to be connected to the support members 1 in such a way that the members 7 provide the actual roughened roadway 8 and the connection between the two support members 1. The upper crosspiece of the hollow profiled member 7 is designated by the reference numeral 9. The two side pieces 10 that extend downwardly from the upper crosspiece 9, at the bottom, are angled off inwardly in order to thus form a downwardly open hollow support member. The horizontal angled portions are designated by the reference numeral 11.

The two side pieces 10 are additionally squared or bent out in a transverse direction to form an approximately rectangular, outwardly directed projecting portion 12 and a rectangular, inwardly directed recessed portion 13. The task of these projections and recesses is to be able to interconnect the sides of adjacent hollow profiled members 7 with one another in a positive manner.

Disposed within the hollow profiled member 7 is a flexurally stiff plate-like member 14, i.e. a member that is resistant to bending. The effective length L of the member 14 is slightly greater than the inside height "h" of the hollow profiled member 7. At its upper end, the member 14 is provided with a small projection 15 that passes through the crosspiece 9. At this location, the projection 15 of the member 14 rests against an abutment 16 of the crosspiece 9.

The hammer head 17' of a bolt 17 extends into the recess 4. The bolt 17 extends through the plate-like member 14, so that by tightening the nut 18 of the screw 17, the member 14 can be pulled in the direction of the arrow 19, in other words, the lower end of the member 14 can be pulled in the direction toward the side wall 3. Pulling the plate-like member 14 in this fashion results in a tight connection between the hollow profiled member 7 and the support members 1. At the same time, the angled portions 11 are also pressed against the projection 6. As the bolt 19 is tightened, lateral feet 20 of the plate-like member 14 are braced against the angled portions 11. It should also be noted the plate-like member 14 is provided with lateral recess means 21 into which the projecting portion 12 extends.

It is to be understood that the clamped or wedged position of the plate-like member 14 that is illustrated in the drawing, and is accomplished under the influence of the bolt 17, presupposes a sufficient rigidity of the member 14. It is to be further understood that by tightening the nut 18, the bottom end of the plate-like member 14 can carry out short sliding movements on the angled portions 11 in order to thus bring about a secure bracing or clamping effect. Furthermore, the angle of inclination of the plate-like member 14, measured relative to a vertical line, is slight, being approximately 10°-20°.

The present invention is, of course, in no way restricted to the specific disclosure of the specification and drawings, but also encompasses any modifications within the scope of the appended claims.

What I claim is:

1. A bolt connection for securing bridges or ramps provided with roadways, walkways as well as other travel surfaces and for connecting a given first hollow profiled member to a given second profiled member that is disposed transverse thereto, with said first hollow profiled member having an inside height; said connection comprises:
   a plate-like member that is resistant to bending and is shiftably disposed in said first hollow profiled member at a steep angle; said plate-like member has a length that is greater than said inside height of said first hollow profiled member; said plate-like member furthermore has a first edge end that displaceably rests on an inner surface of said first hollow profiled member, and a second edge end that rests against an abutment provided on said first hollow profiled member remote from said inner surface thereof; and
   a bolt that includes opposite ends and that is supported at the opposite ends of said bolt by said second profiled member and said plate-like member respectively and also is provided with means for pulling first and second ends of said plate-like member against said abutment and said inner surface of said first hollow profiled member into a rigidly fixed position as clamped and wedged at the steep angle substantially transversely inside said first hollow profiled member and at the same time via said bolt holding said second profiled member fixed in transverse positioning thereof relative to said first hollow profiled member.

2. A bolt connection according to claim 1, in which said plate-like member is disposed at an angle of approximately 10°-20° relative to a vertical plane.

3. A bolt connection according to claim 2, in which, when viewed in a position of use, said abutment is disposed toward the top and said first displaceable end of said plate-like member is disposed toward the bottom.

4. A bolt connection according to claim 3, in which said second profiled member is provided with a projection upon which said first hollow profiled member rests.

5. A bolt connection for connecting a given first hollow profiled member to a given second profiled member that is disposed transverse thereto, with said first hollow profiled member having an inside height; said connection comprises:
   a plate-like member that is resistant to bending and is disposed in said first hollow profiled member at a steep angle; said plate-like member has a length that is greater than said inside height of said first hollow profiled member; said plate-like member furthermore has a first end that displaceably rests on an inner surface of said first hollow profiled member, and a second end that rests against an abutment provided on said first hollow profiled member remote from said inner surface thereof; and
   a bolt that is supported by said second profiled member and said plate-like member and is provided with means for pulling said plate-like member against said abutment and said inner surface of said first hollow profiled member; said plate-like member being disposed at an angle of approximately 10°-20° relative to a vertical plane; when viewed in a position of use, said abutment being disposed toward the top and said first displaceable end of said plate-like member being disposed toward the bottom; said second profiled member being provided with a projection upon which said first hollow profiled member rests; said second end of said plate-like member being provided with a projection that extends through a wall of said first hollow profiled member to rest thereagainst.

6. A bolt connection according to claim 5, in which said bolt is provided with a hammer-head-like enlargement; and in which said second profiled member is provided with a longitudinally extending, undercut recess means in which is disposed said bolt enlargement.

7. A bolt connection according to claim 6, which includes a plurality of successively adjacent hollow profiled members all connected to said second profiled member, with those facing sides of adjacent ones of said hollow profiled members interengaging in a positive manner.

* * * * *